United States Patent
Fukimoto et al.

(10) Patent No.: US 8,589,817 B2
(45) Date of Patent: Nov. 19, 2013

(54) TECHNIQUE FOR SUPPORTING USER DATA INPUT

(75) Inventors: Shunsuke Fukimoto, Kanagawa-ken (JP); Kiyonori Komiya, Kawasaki (JP); Ken Kumagai, Kangawa (JP)

(73) Assignee: Internaional Business Machines Corporation, Armonk, NY (US)

( * ) Notice: Subject to any disclaimer, the term of this patent is extended or adjusted under 35 U.S.C. 154(b) by 518 days.

(21) Appl. No.: 12/350,882

(22) Filed: Jan. 8, 2009

(65) Prior Publication Data

US 2009/0183090 A1 Jul. 16, 2009

(30) Foreign Application Priority Data

Jan. 10, 2008 (JP) .................................. 2008-3739

(51) Int. Cl.
*G06F 3/0481* (2013.01)
(52) U.S. Cl.
USPC ............ 715/780; 715/764; 715/762; 715/744
(58) Field of Classification Search
USPC ........................................................ 715/780
See application file for complete search history.

(56) References Cited

U.S. PATENT DOCUMENTS

| 5,233,513 | A | * | 8/1993 | Doyle | 705/7.11 |
|---|---|---|---|---|---|
| 6,100,891 | A | * | 8/2000 | Thorne | 715/854 |
| 6,163,878 | A | * | 12/2000 | Kohl | 717/100 |
| 6,973,625 | B1 * | | 12/2005 | Lupo et al. | 715/762 |
| 7,296,017 | B2 * | | 11/2007 | Larcheveque et al. | 1/1 |
| 7,328,428 | B2 * | | 2/2008 | Baugher | 717/124 |
| 7,401,094 | B1 * | | 7/2008 | Kesler | 707/805 |
| 7,640,166 | B2 * | | 12/2009 | Wiederin et al. | 705/1.1 |
| 7,913,184 | B1 * | | 3/2011 | Zhang et al. | 715/780 |
| 2002/0007335 | A1 * | | 1/2002 | Millard et al. | 705/37 |
| 2003/0220855 | A1 * | | 11/2003 | Lam et al. | 705/34 |
| 2004/0024842 | A1 * | | 2/2004 | Witt | 709/219 |
| 2004/0268225 | A1 * | | 12/2004 | Walsh et al. | 715/501.1 |
| 2005/0066263 | A1 * | | 3/2005 | Baugher | 715/500 |

(Continued)

FOREIGN PATENT DOCUMENTS

| JP | 63094324 A1 | 4/1988 |
|---|---|---|
| JP | 2004234651 A | 8/2004 |

OTHER PUBLICATIONS

Yoichi, et al., "System and Method for Data Input Processing and Recording Medium", PAJ Publication No. 11-212699 (Aug. 6, 1999), NTF Data Corp, Abstract Only.*

(Continued)

*Primary Examiner* — William Bashore
*Assistant Examiner* — Reza Nabi
(74) *Attorney, Agent, or Firm* — Kali Law Group, P.C.

(57) ABSTRACT

Methods for supporting user data input are presented including receiving a page for display on a display unit, wherein the page includes a number of input fields; receiving a number of input support functions, where each of the number of input support functions is associated with each of the number of input fields; generating an alternative field for receiving the user data input; detecting an input field in accordance with a user selection; setting one of the input support functions associated with the input field to the alternative field; entering user data input into the alternative field; and copying the user data input entered into the alternative field to the input fields. In some embodiments, methods further include generating a tab index, where the tab index is configured to move the alternative field to a next input field in response to a tab key stroke.

24 Claims, 11 Drawing Sheets

(56) References Cited

U.S. PATENT DOCUMENTS

| | | | |
|---|---|---|---|
| 2005/0091577 A1* | 4/2005 | Torres et al. | 715/507 |
| 2005/0210263 A1* | 9/2005 | Levas et al. | 713/182 |
| 2005/0289182 A1* | 12/2005 | Pandian et al. | 707/104.1 |
| 2006/0064313 A1* | 3/2006 | Steinbarth et al. | 705/1 |
| 2007/0011083 A1* | 1/2007 | Bird et al. | 705/38 |
| 2008/0077530 A1* | 3/2008 | Banas et al. | 705/50 |
| 2008/0102819 A1* | 5/2008 | Bengtsson et al. | 455/425 |
| 2008/0235578 A1* | 9/2008 | Heed et al. | 715/269 |
| 2010/0145839 A1* | 6/2010 | Lam et al. | 705/34 |
| 2010/0235918 A1* | 9/2010 | Mizrahi et al. | 726/25 |
| 2010/0251143 A1* | 9/2010 | Thomas et al. | 715/760 |

OTHER PUBLICATIONS

Javascript Validation Elements discussion forum posted by Gregg Bolinger at Coderanch website <http://coderanch.com>, published on Aug. 22, 2003, 3 pages.*

"Thread: Show / Hide div based on the radio button", Posted by Vic at <http://webdeveloper.com>, published on Sep. 18, 2009, 7 pages.*

Yoichi, et al., "System and Method for Data Input Processing and Recording Medium", PAJ Publication No. 11-212699 (Aug. 6, 1999), NTT Data Corp, Abstract only.

"Designing Parts with Style Sheets", web creators, Japan, MdN Corp., (Jun. 1, 2007) vol. 66, pp. 52-65 (partial translation).

"Web Creator, Ch. 3 Styling of Components Using Style Sheets", (Jun. 1, 2007) Abstract for Designing Parts, Issue 66, 1 pp.

"Designing Parts with Style Sheets", Partial Translation of Office Action mailed Sep. 11, 2012, re Japanese Patent Application No. 2008-003739, 1 pg.

Oofuji, "HMTL & XHTML & CSS Dictionary" 3rd Ed., Appendix p. 536, (Jun. 2012) Shuwa System Co., Ltd., 3 pp.

Junko, Bibliographic data re JP63094324A, published Apr. 25, 1988, (ESPACENET), Abstract only.

* cited by examiner

| INPUT ID | INPUT SUPPORT FUNCTION |
|---|---|
| INPUT1 | ALPHABET INPUT |
| INPUT2 | DATE INPUT |
| INPUT3 | NUMERIC INPUT THREE-DIGIT COMMA |
| INPUT4 | ALPHABET INPUT |
| INPUT5 | DATE INPUT |
| INPUT6 | NUMERIC INPUT THREE-DIGIT COMMA |
| ⋮ | ⋮ |

FIG. 5

TECHNIQUE FOR SUPPORTING USER DATA INPUT

PRIORITY CLAIM TO FOREIGN APPLICATION

A claim for priority is hereby made under the provisions of 35 U.S.C. §119 for the present application based upon Japanese Patent Application No. 2008-3739, filed on Jan. 10, 2008, which is incorporated herein by reference.

FIELD OF THE INVENTION

The present invention relates to a technique for supporting user data input, and particularly to a technique for supporting user data input into an input field.

BACKGROUND

It is possible to set various input support functions to an input field displayed on a web page. For example, one input support function enables a numeric entered into an input field to be displayed with a comma every three digits. Another input support function enables only alphabetical characters to be accepted without accepting numerics, symbols and the like. These input support functions improve the user friendliness and prevents input error.

SUMMARY OF THE INVENTION

In recent years, to achieve cost reductions and promote efficiencies in development and maintenance, general-purpose techniques such as web browsers and web servers have become used widely for business-oriented information systems and the like. For example, in some cases, systems for financial and distribution operations have many opportunities to input significant numerical data such as price and quantity, in comparison with a normal web page. If such input is realized using standard web techniques, many input fields are displayed on a page, as for example, in a web browser.

In order to set input support functions to the respective input fields, conventionally a program described in JAVASCRIPT™ or other program language is executed when a page is displayed. For techniques using JAVASCRIPT™, refer to the above Patent Document 1. The program performs a process of enabling an input support function corresponding with each input field therefor. Thus, processing time for enabling processes increases in proportion with the number of input fields. Thus, processing time becomes a waiting time for a user until the page is available, which could lead to a reduction in user friendliness.

Therefore, it is an object of the present invention to provide a system, method, and program capable of solving the above problem. This object is achieved by the combination of features of the independent claims in the appended claims. The dependent claims define further advantageous embodiments of the present invention.

As such, methods for supporting user data input are presented including receiving a page for display on a display unit, wherein the page includes a number of input fields; receiving a number of input support functions, where each of the number of input support functions is associated with each of the number of input fields; generating an alternative field for receiving the user data input; detecting an input field in accordance with a user selection; setting one of the input support functions associated with the input field to the alternative field; entering user data input into the alternative field; and copying the user data input entered into the alternative field to the input fields. In some embodiments, methods further include generating a tab index, where the tab index is configured to move the alternative field to a next input field in response to a tab key stroke. In some embodiments, methods further include: detecting a second input field in accordance with a user selection; disabling a previous input support function; setting the input support functions associated with the second input field to the alternative field; entering a second user data input into the alternative field; and copying the second user data input entered into the alternative field to the second input field. Moreover, there are provided a method and program for causing a computer to function as the system.

The above summary of the invention does not necessarily describe all necessary features and the invention may also be a sub-combination of these described features.

BRIEF DESCRIPTION OF THE SEVERAL VIEWS OF THE DRAWINGS

FIG. 5 is a diagram illustrating an example of a data structure of a storage device 204 in accordance with an embodiment of the present invention;

DETAILED DESCRIPTION

While the present invention will be described hereinafter by way of embodiments, the following embodiments do not limit the invention according to claims and all combinations of the features described in the embodiments are not necessarily essential to means for solving the problems of the invention.

Figure 1:
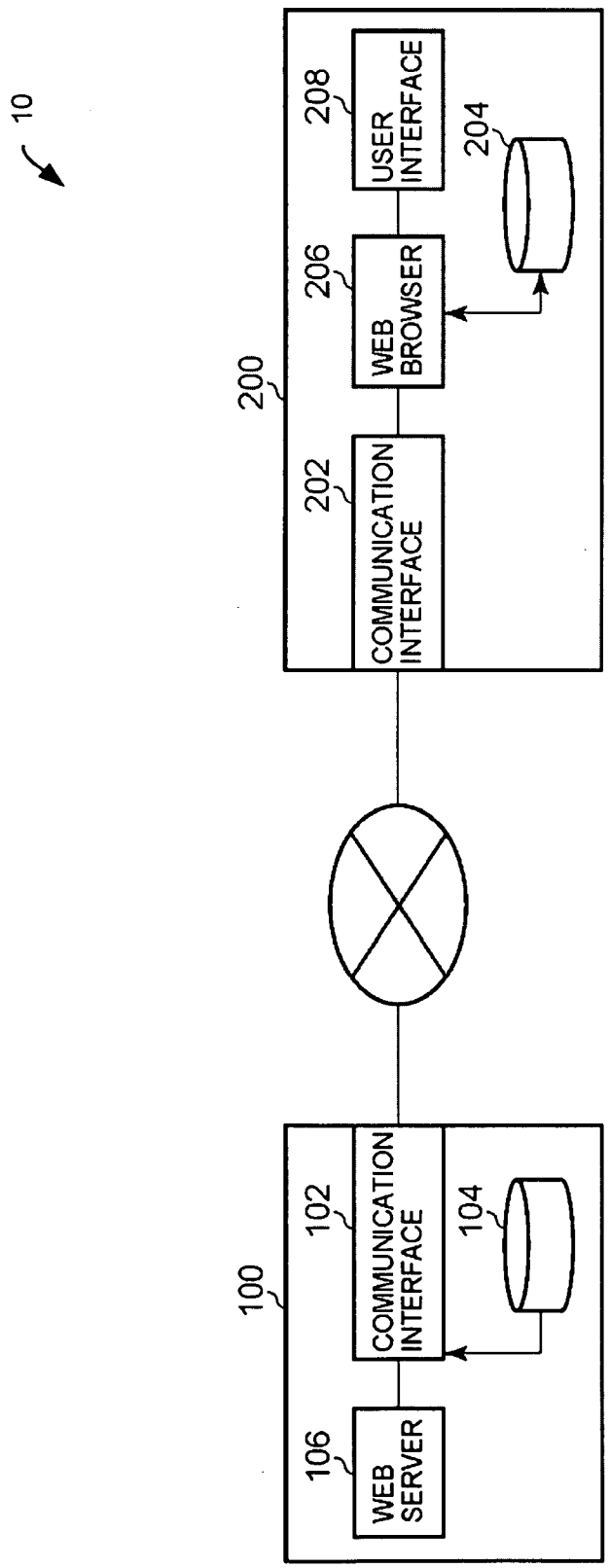
FIG. 1 is a diagram illustrating a general configuration of an information system in accordance with an embodiment of the present invention.

FIG. 1 shows a general configuration of an information system 10 according to the present embodiment. The information system 10 includes a server device 100 and a client device 200 connected to the server device 100 via a communication network. The communication network may be a public network such as, for example, the Internet or a private network such as, for example, a company's intranet.

Server device 100 has, as basic hardware, storage device 104 such as, for example, a hard disk drive and communication interface 102 such as, for example, a network interface card (NIC). Moreover, server device 100 functions as web server 106 by executing a program read from storage device 104 using a CPU. Web server 106 sends back a web page in response to a request received from client device 200.

Client device 200 has, as basic hardware, storage device 204 such as, for example, a hard disk drive, communication interface 202 such as, for example, a network interface card (NIC), and user interface 208 such as, for example, a display screen, a pointing device, or a keyboard. Moreover, the client device 200 functions as a web browser 206 by executing a program read from a storage device 204 using a CPU. Upon receiving a selection operation or an input operation from a user, the web browser 206 displays its selection result or input result for the user.

Web browser 206 sends a request to web server 106, if necessary. A reply to the request is the next web page. By repeating the request, the web browser 206 receives web pages in sequence and displays them in the user interface 208. This enables the user to obtain desired information from the web server 106 and to reflect desired input data (for example, an order and price of a commodity) on a database in the server device 100.

Figure 2:
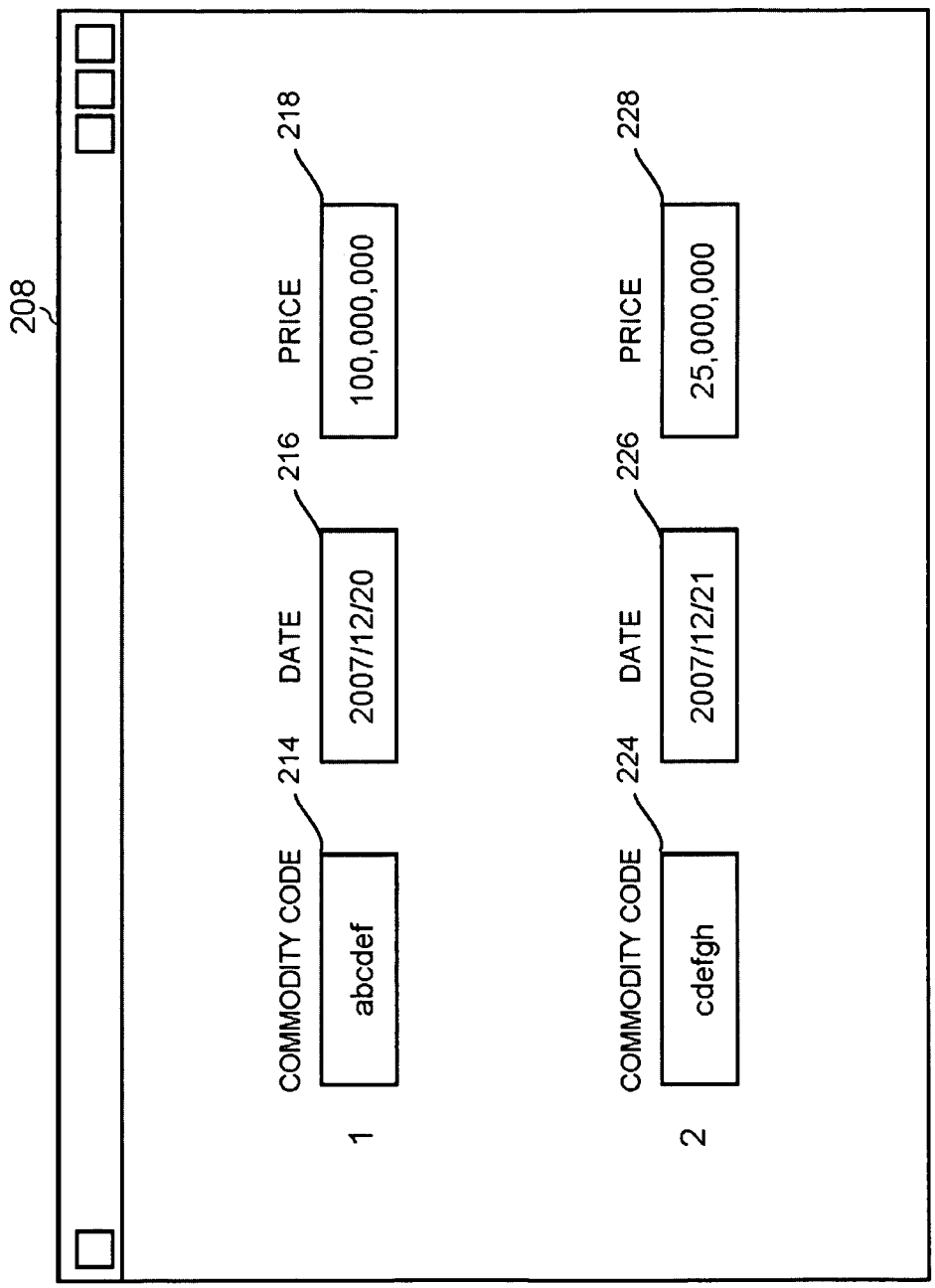
FIG. 2 is a diagram illustrating an example of a screen displayed in a user interface in accordance with an embodiment of the present invention.

FIG. 2 shows an example of a screen displayed on the user interface 208 according to this embodiment. This type of web server 106 and web browser 206 may be utilized in a public Internet, as well as, in a company's private network in some embodiments. In such a embodiment, the number of data items to be entered may be large depending on the types of operations, which results in a large number of input fields displayed on a page.

For example, the user interface 208 displays input fields (214, 224) for accepting an input of a commodity code, input fields (216, 226) for accepting the date of input of the commodity code, and input fields (218, 228) for accepting the price of the commodity. These input fields are associated with each commodity, and therefore the number of input fields is equal to a value obtained by multiplying the number of commodities by 3, which may be excessive in some cases. For example, in FIG. 2, six input fields are displayed in total for two commodities.

It may be desirable for an input support function to be set to each input field according to the type of data expected to be entered into the input field. For example, an input support function that accepts only an input of alphabetical characters for specifying the commodity code without accepting an input of other types of characters may be set to the input field for a commodity code. This prevents a user from entering an incorrect commodity code.

Moreover, it may be preferable to set, to an input field of a date, an input support function of converting the format of an entered numeric to a predetermined format that indicates a date. For example, upon receiving an input of a numeric of 20071220, the input support function changes the numeric to "2007/12/20." This allows a user to enter the date appropriately without an input of a symbol such as "/," which may provide high user friendliness.

Similarly, an input support function may be set to an input field for a price so as to facilitate an input of a price. For example, a numeric entered into the field is changed into a format of a numeric with a comma every predetermined number of digits (for example, three digits in this specification). The input support functions are not limited to the above, but may include various functions such as, for example, a mask input function or an error check function. While such input support functions are convenient, some processing time may be required to set the input support functions in some cases.

For example, if an attempt is made to perform such input support function in a program written in JAVASCRIPT™ in a web page, processing time may be required to set the input support function, which depends on the number of input fields. If the number of input fields is small, the processing time is short to an extent that a user is not aware of the time. If, however, an attempt is made to enter data for business use into a web page having an enormous number of input fields, for example, long waiting times may result.

For this situation, the input support functions may be set to a single alternative input field in an embodiment, instead of setting the input support function to each of the input fields, in order to reduce the waiting time. An example thereof will be shown in FIGS. 3A to 3C.

Figure 3A:
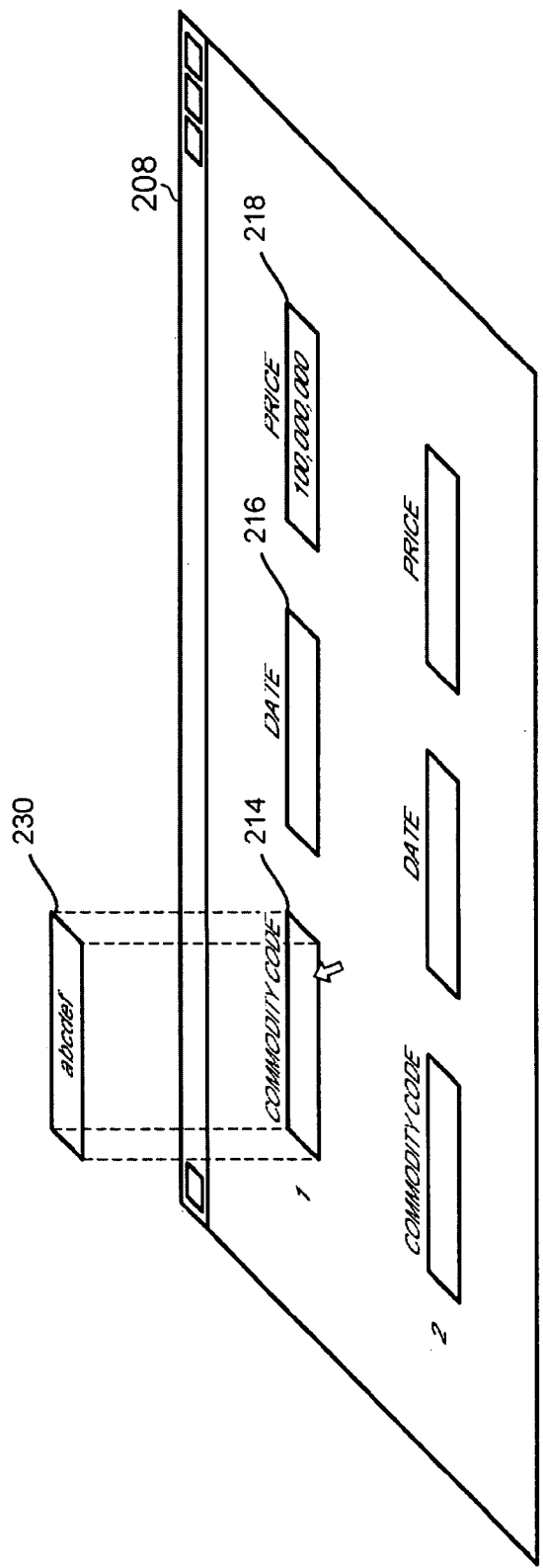
FIG. 3A is a first diagram illustrating a structure of the screen displayed in the user interface in accordance with an embodiment of the present invention.

FIG. 3A is a first diagram illustrating the structure of a screen displayed in user interface 208 according to an embodiment. Web browser 206 (FIG. 1) according to this embodiment generates an alternative field, first. The alternative field is generated in common with respect to a plurality of input fields in order to accept data input on behalf of the plurality of input fields in a page.

Alternative field 230 may be displayed in a superimposed manner on, for example, one of the input fields (i.e. first input field 214). As a practical matter, it is impossible for the user to distinguish alternative field 230 from the first input field 214 since alternative field 230 is superimposed on first input field 214. In FIG. 3A, alternative field 230 is shown shifted from the user interface 208 in a three-dimensional direction so as to allow alternative field 230 to be easily distinguished from first input field 214.

In this example embodiment, if the user now selects a first input field for accepting an input of a commodity code of a commodity 1 using a pointing device, alternative field 230 is displayed in a superimposed manner on the first input field 214. If the user enters data "abcdef," the data is entered into alternative field 230, instead of first input field 214.

Note here that alternative field 230 is displayed in a superimposed manner on first input field 214 and therefore the user recognizes as if he/she entered the data into first input field 214. Moreover, an input support function which would otherwise be set to the input field may now be set to the alternative field. Therefore, only an input of alphabetical characters is accepted, which enables the user to enter the commodity code appropriately.

Figure 3B:
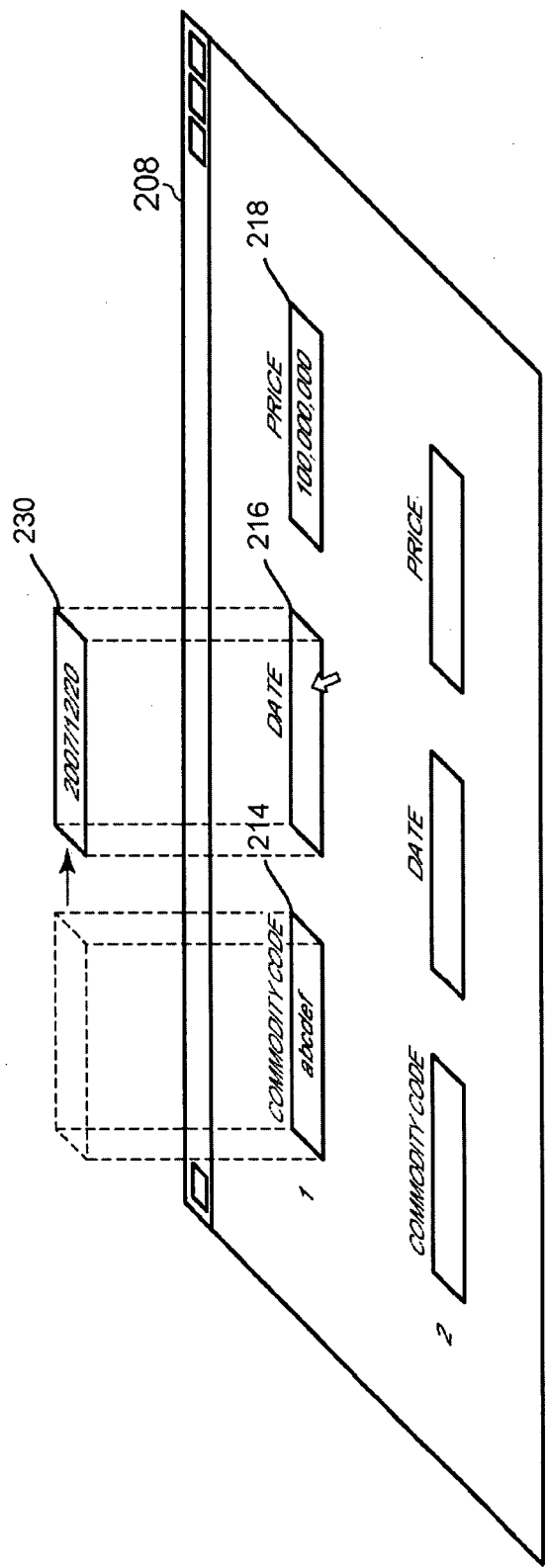
FIG. 3B is a second diagram illustrating a structure of the screen displayed in the user interface in accordance with an embodiment of the present invention.

FIG. 3B is a second diagram illustrating the structure of a screen displayed in the user interface 208 according to this embodiment. Subsequently, if the user selects a second input field 216 for accepting an input of a date of the commodity 1 using a pointing device or the like, alternative field 230 is moved onto second input field 216 and displayed thereon in a superimposed manner. In that case, the data "abcdef" that has already been entered into alternative field 230 before moving is copied to first input field 214 on which the alternative field had been superimposed before the moving.

Thereafter, if the user enters data "20071220" after the moving, the data is entered into alternative field 230, instead of second input field 216. Note here that alternative field 230 is displayed in a superimposed manner on second input field 216. Therefore the embodiment operates so that the user enters data as though he/she entered the data into second input field 216. Moreover, an input support function which would be set to second input field 216 is set to alternative field 230.

Therefore, the numeric is appropriately changed into a date format, which allows the user to enter the date with a simple operation.

Figure 3C:
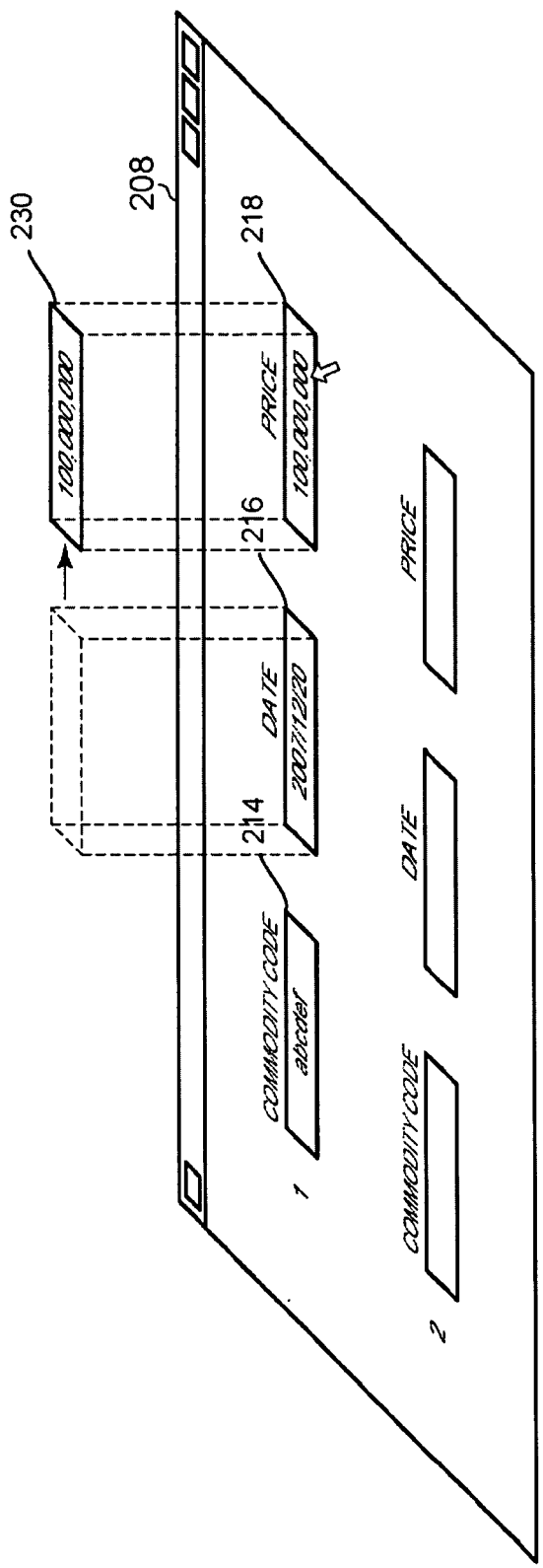
FIG. 3C is a third diagram illustrating a structure of the screen displayed in the user interface in accordance with an embodiment of the present invention.

FIG. 3C is a third diagram illustrating the structure of a screen displayed in the user interface 208 according to this embodiment. Subsequently, if the user selects third input field 218 for accepting an input of a price of the commodity 1 using a pointing device or the like, alternative field 230 is moved onto third input field 218 and displayed thereon in a superimposed manner. The data that has already been entered into third input field 218 is copied into and displayed on alternative field 230. Therefore, the user sees third input field 218 as if the field were directly displayed together with the input data.

According to the above configuration, it is possible to perform appropriate input support based on the property of each of the input fields by switching the input support function of the alternative field every time the corresponding input field is selected without setting the input support functions to all input fields at the time of displaying a page. This reduces the waiting time during page display without losing the convenience caused by the input support. Hereinafter, the description will be continued for the configuration for carrying out the reduction.

Figure 4:
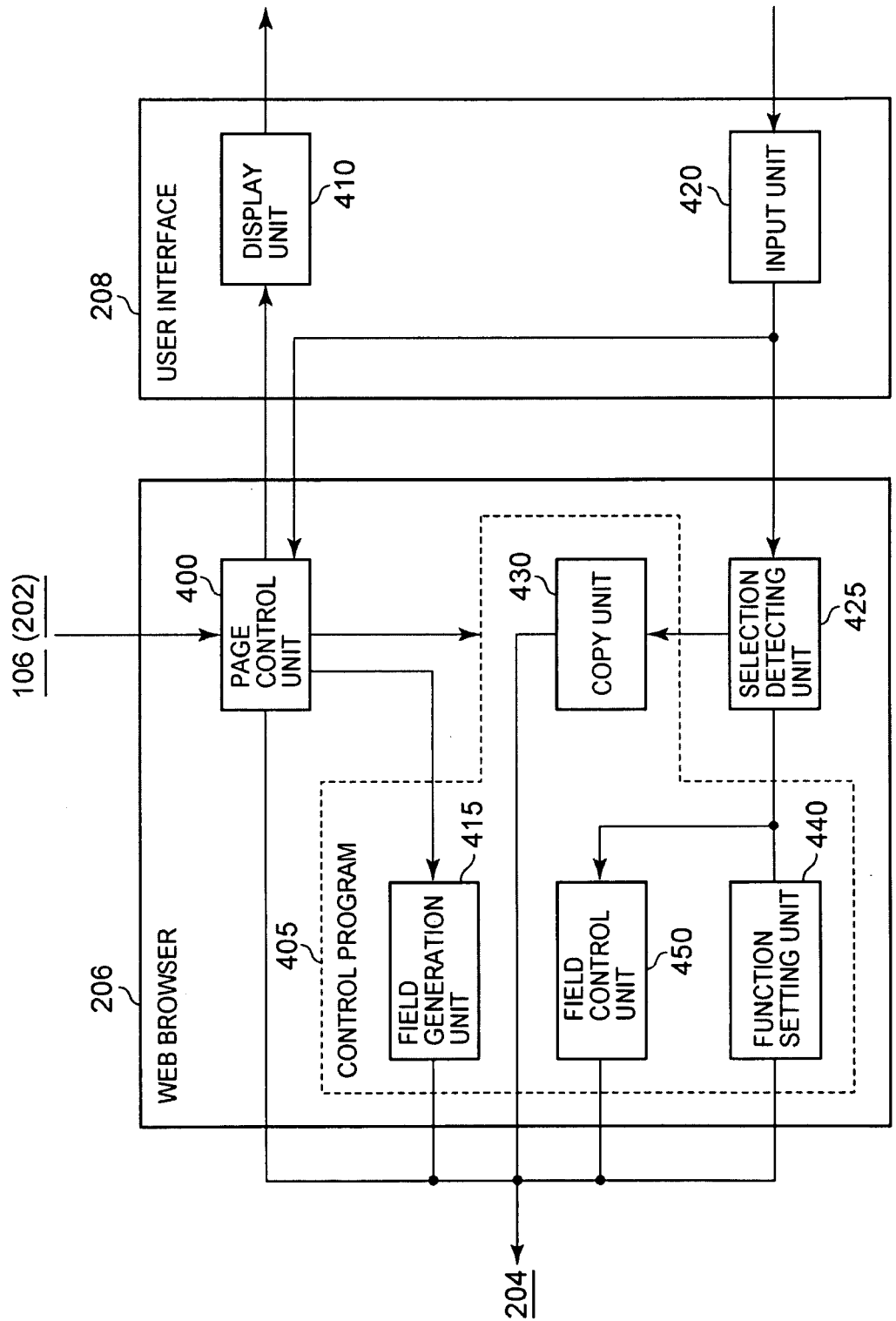
FIG. 4 is a diagram illustrating a functional configuration of a web browser 206 in accordance with an embodiment of the present invention along with the functions of the user interface.

FIG. 4 shows a functional configuration of the web browser 206 according to this embodiment along with the functions of user interface 208. The web browser 206 has page control unit 400 and selection detecting unit 425. Page control unit 400, which is a member for implementing one of the basic functions of web browser 206, receives a web page from web server 106 and stores the web page into storage device 204. For the reception of the web page, communication interface 202 is used. Moreover, web browser 206 displays the web page on display unit 410 of user interface 208.

The web page contains a plurality of input fields. The web page may contain not only a so-called page description part, which is written in Hypertext Markup Language (HTML), but also a program part written in JAVASCRIPT™. For purposes of this discussion, the program part is assumed to be control program 405. Control program 405 is not necessarily composed of a single file. For example, control program 405 may be formed by performing an include processing of one file so as to include the file in another file. In the following description, control program 405 may be composed of any number of files which also be referred to simply as control program 405 for simplification of the description. Web browser 206 also operates field generation unit 415, copy unit 430, function setting unit 440, and field control unit 450 by executing the control program 405 through the CPU control.

Field generation unit 415 begins operating immediately after a web page is displayed on display unit 410. Then, field generation unit 415 generates an alternative field, which accepts data input on behalf of an input field as noted above. Further, as noted above, the alternative field generated corresponds with any number of input fields in the page and is displayed on display unit 410. The alternative field may be displayed, for example, by adding an object indicating the alternative field to the page description part stored in the storage device 204.

At substantially the same time as the web page is displayed, the input support functions may be set to the corresponding input fields that are stored in the storage device 204 in such a way that the input support functions are associated with the plurality of input fields in the page, respectively. For example, the input support functions may be stored in association with the respective input fields individually in such a way that the first input field corresponds to an alphabetical input function and the second input field corresponds to a date input function in some embodiments. Moreover, storage device 204 may further store the order in which the input fields are focused on among the plurality of input fields in the page in association with the plurality of input fields in the page in some embodiments. "Input fields are focused on" means that the input fields are selected so as to allow data to be entered into the input fields.

Selection detecting unit 425 may then implement one of the basic functions of the web browser 206. Specifically, selection detecting unit 425 detects an input field selected by the user to enter data out of the plurality of input fields in the page on the basis of user operation of input unit 420. Input unit 420 is, for example, a keyboard or a pointing device such as a mouse.

As utilized herein, the term "select" means to move a cursor to the input field by operating a tab key or arrow key on the keyboard. Alternatively, the term "select" may mean to click the input field using a pointing device. As such, any manner of selection known in the art may be utilized without departing from the present invention. If the user performs an operation for focusing on the next input field, for example, using the tab key, the input field next to the currently selected input field in the order of the input fields is selected. If the user performs an operation for focusing on the previous input field, for example, by pressing the tab key while pressing a shift key, the input field previous to the currently selected input field in the order of the input fields is selected.

From the viewpoint of a JAVASCRIPT™ program, the selection operation means an occurrence of an event previously associated with a mouse click or keypress. Selection detecting unit 425 causes the various events to start various processes of control program 405.

The description will be continued on the assumption that the selection detecting unit 425 has detected a certain first input field as a selected input field. In this situation, the field control unit 450 moves the alternative field to and displays the field on a position that depends on the position in the page where the first input field is displayed. The position where the alternative field is displayed is preferably a substantially superimposed position on the first input field. The term "superimposed" means that the fields are at least partially overlapped. Preferably, the alternative field and the first input field have the same shape and size, and the alternative field is superimposed exactly on the first input field.

The description will be continued on the assumption that the selection detecting unit 425 has detected a second input field subsequently. First, copy unit 430 copies data, which has been entered into the alternative field until the second input field is detected, into the first input field; Also such copying between the fields may be preformed through a process of changing the page description part in storage device 204. Thereafter, copy unit 430 copies, to the alternative field, data that has already been entered into the second input field until the second input field is detected.

Moreover, function setting unit 440 disables the first input support function, which has already been set in association with the first input field, in the alternative field. Then, function setting unit 440 reads the second input support function corresponding to the second input field from storage device 204 and sets the second input support function to the alternative field. This enables the user to receive a support as if the input operation to the alternative field were an input operation to the second input field.

Subsequently, field control unit 450 displays the alternative field to which the second input support function is set so as to be superimposed on the second input field. Preferably field control unit 450 further sets a display attribute of the second input field to the alternative field. The display attribute is, for example, the height or width of a field frame.

In addition, the display attribute may be a font for displaying characters entered into the field or a color for displaying the characters. Moreover, the display attribute may be a background color or foreground color of the field. This allows the user to continue the input operation without awareness of the existence of the alternative field.

FIG. 5 illustrates an example of a data structure of storage device 204 (FIG. 4) according to this embodiment. Storage device 204 previously stores the input support functions using a function of control program 405 (FIG. 4) at the start of the operation of control program 405. Specifically, storage device 204 stores the input support functions to be set to the respective input fields in association with the respective input fields in addition, the storage device 204 may further store the order in which the input fields are focused on among the plurality of input fields.

As an example of the above, storage device 204 may be configured to store, for a certain input field, an input field ID "input1" 502 of the input field in association with an input support function "alphabet input" 504 which should be set to the input field. In other words, the input field accepts only an input of alphabetical characters and does not accept an input of other types of characters.

FIG. 5 illustrates a representative example of the corresponding function in an understandable way. In particular the description, "alphabet input" will be further illustrated. Note here that in this example embodiment, storage device 204 actually stores a function call statement to implement the "alphabet input" function, instead of the characters "alphabet input." The implementation of these processes in JAVASCRIPT™ is expressed, for example, as follows:
eventRegistryArray["input1"]="setBehaviorAssist( );";
In this regard, however, the function setBehaviorAssist( ) is similarly defined in the control program 405, for example, as follows:

```
function setBehaviorAssist( ) {
    /*input support function 1: setting process for accepting only alphabetical characters*/
    ...
}
```

In the above, eventRegistryArray is an array variable in which the subscript of the array variable represents an input field and the entity of the array variable represents the input support function. In this embodiment, the input support functions which should be set are represented by the function setBehaviorAssist in a mass. If only one input support function should be set as described above, the entity of the function setBehaviorAssist is represented by a single setting process.

The input support function 2 denotes a function of detecting a key input as an event, determining whether the type of data entered by the key input is alphabetical, and accepting the data input on condition that the data type is alphabetical. Unless the type of data to be entered is alphabetical, the input field may be colored with a specific color and blinked in order to show in a clearly understandable way that the data input is not accepted.

Similarly, the input support functions associated with other input fields are stored in association with other input field IDs. For example, a first input support function "numeric input" and a second input support function "three-digit comma" to be set to the corresponding input field are stored in association with an input field ID "input3." In this manner, two or more input support functions may be stored in association with one input field.

For example, these input support functions similarly written in the JAVASCRIPT™ program are as follows:
eventRegistryArray["input3"]="setNumberAssist( );";
In this regard, however, the function setNumberAssist( ) is similarly defined in control program 405, for example, as follows:

```
function setNumberAssist( ) {
    /*input support function 1: setting process for accepting only numerics*/
    ...
    /*input support function 2: setting process for adding three-digit commas*/
    ...
}
```

In this manner, any number of input support functions may be associated with one input field. In such a case, commands for setting the plurality of input support functions are described in the function associated with the input field.

As described above, at the time when web browser 206 receives a web page, the input support function itself is not set, but simply a function for setting the input support function is registered in association with the corresponding input field. This process is simply an assignment of a value to an array variable in the JAVASCRIPT™ program. Therefore, the user's waiting time is very short at the time when the web page is displayed.

Figure 6:
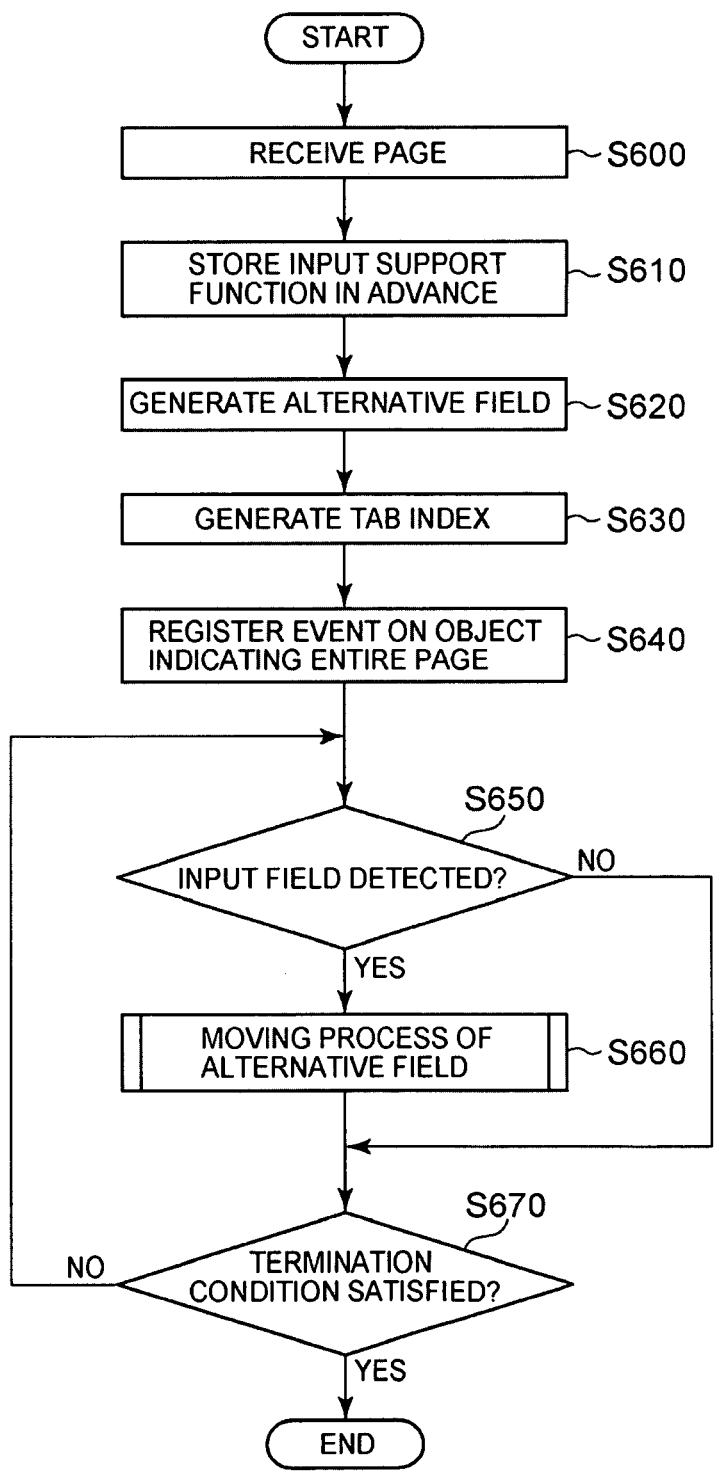
FIG. 6 is a diagram illustrating an example of processing of accepting a data input from a user using a web browser in accordance with an embodiment of the present invention.

FIG. 6 shows an example of a process of accepting a data input from the user using web browser 206 (FIG. 4) according to this embodiment. First, page control unit 400 (FIG. 4) receives a file for displaying a web page from web server 206 and stores the file into the storage device 204 (S600). Then, page control unit 400, first, executes the control program 405, which has been contained in the file and thus received, to store the input support function into storage device 204 in association with the input field (S610).

The process of storing and associating input support functions with the input field has been described with reference to FIG. 5. Specifically, for example, an array variable eventRegistryArray with an input field ID as a subscript is defined and then a character string "setBehaviorAssist( )" is assigned to the variable "eventRegistryArray[input1]." The entity of the function "setBehaviorAssist( )" is a command for setting the input support function "alphabet input" to its input field "input1."

Subsequently, field generation unit 415 generates an alternative field which accepts the data input on behalf of input fields corresponding with any number of input fields in the web page and displays the alternative field on display unit 410 (S620). The display of the alternative field may be performed, for example, by a process of adding an object indicating the alternative field to the above-described page description part stored in the storage device 204. This process which is performed using JAVASCRIPT™ is represented in an embodiment, by the following example, where a variable "dummy" indicates the alternative field.

```
var dummy=document.createElement("input");
dummy.id="_dummy";
```

Moreover, page control unit 400 generates a tab index by executing the control program 405 and stores the tab index into the storage device 204 (S630). If the user presses the tab key in a state where one first input field is selected in an ordinary web browser 206, a second input field that may be located, for example, next to the first input field, is selected. This process is performed by a basic function of web browser 206 in many cases.

In web browser 206 according to this embodiment, however, even if one input field is displayed as if it were selected, the alternative field, which is displayed on the input field in a superimposed manner, is actually selected. Moreover, a process expected in the case of receiving an instruction of focusing the next input field by pressing the tab key in this state is not a change of the selected input field, but a moving process of the alternative field. This moving process allows the alternative field, which is displayed on the first input field in a superimposed manner, to be moved onto the second input field.

A tab index is prepared to perform the above process. Specifically, the tab index stores the order of each input field focused on, in association with each input field, and more specifically, stores the order of selection of the input fields made by the user through sequential operation of the tab key.

In this embodiment, input field IDs are stored into a storage device in an order in which input fields are focused based on the tab index previously set for each input field. In an embodiment, a tab index of an input field "input1" may be obtained by the following.

var inputField=document.getElementById("input 1");

where inputField.tabIndex indicates the tab index of the input field "input1."

The above process may be repeated with respect to all input fields in the page as follows: the combination of the input field ID and the tab index is obtained; the input field IDs are sorted in the ascending order according to the value of the tab index; and the result is stored into the variable tabOrderArray. In the consequence, the order of selection of the input fields is stored in the variable tabOrderArray. In an embodiment, the values of the array variable tabOrderArray are as follows:

tabOrderArray[0]="input1"
tabOrderArray[1]="input2"
tabOrderArray[2]="input3"

A value representing a number of an input field focused on is stored in the variable nowOrder. In order to focus on an input field whose tab index is minimum in an initial state, zero is assigned to nowOrder.

Subsequently, page control unit 400 sets an event to be detected on an object that indicates the entire page (for example, body in HTML) displayed on the display unit 410 by executing the control program 405 (S640). This process described in JAVASCRIPT™ is, in an embodiment, as follows:

var body=document.body;
body["onkeydown"]="handleKeyDown(event)";
body["onkeyup"]="handleKeyUp(event)";
body["onclick"]="handleMouseClick(event)";

This allows a setting to be made in such a way that a function handleKeyDown is executed for the document.body object at the occurrence of an event "onkeydown" which indicates that the key is pressed. Similarly, settings are made in such a way that a function handleKeyUp may be executed at the occurrence of an event "onkeyup" and a function handleMouseClick is executed at the occurrence of an event "onclick."

Regarding "handleKeyDown(event)," the process depends on whether the tab key is pressed or any other key is pressed.

If the tab key is pressed, a value is copied from the alternative field to the first input field and then the input support function set to the alternative field is disabled. Any other key input is treated as data input to the alternative field.

Regarding "handleKeyUp(event)," the process depends on whether the tab key is released or any other key is released. If the tab key is released, the second input field is detected from the storage device. The input support function corresponding to the second input field is set to the alternative field and the alternative field is moved to the position where the alternative field is superimposed on the second input field. If any other key is released, the event is treated as data input to the alternative field.

In "handleMouseClick(event)," the same process as when the tab key is pressed in "handleKeyDown(event)" is performed and then the same process as when the tab key is released in "handleKeyUp(event)" is performed using the second input field as a clicked input field.

Subsequently, selection detecting unit 425 detects, on the basis of a user's operation, an input field that the user selected to enter data out of the plurality of input fields (S650). Hereinafter, the description will be continued on the assumption that selection detecting unit 425 detected the second input field subsequently to the first input field.

The selection of the input field is performed, for example, by clicking on the input field using a pointing device or pressing the tab key on the keyboard. To perform the selection of the input field by pressing the tab key, the order of the current input field is stored in the nowOrder variable. An ID of the input field selected thereby is detected, for example, by the following:

(If the pointing device is used)
var nextId=event.srcElement.Id,
(If the tab key is pressed)
nowOrder++;
var nextId=tabOrderArray[nowOrder];

Specifically, if a pointing device is used, selection detecting unit 425 obtains the ID of an element where a click event with the pointing device is detected. On the other hand, if a tab key is pressed, selection detecting unit 425 detects, as the second input field selected by tile user, the input field next to the above first input field in the order stored as the tab index in the above step S630. This allows the second input field next to the first input field in the order of the input fields stored in the tab index to be detected as an input field selected by the user, in response to the detection of the instruction of focusing on the next input field using the tab key in the state where the first input field has already been detected.

If a tab key is pressed after the use of the pointing device, the variable nowOrder is recalculated from a variable nextId and an array tabOrderArray to calculate nextId in the same procedure as for the tab key in the above.

Figure 7:
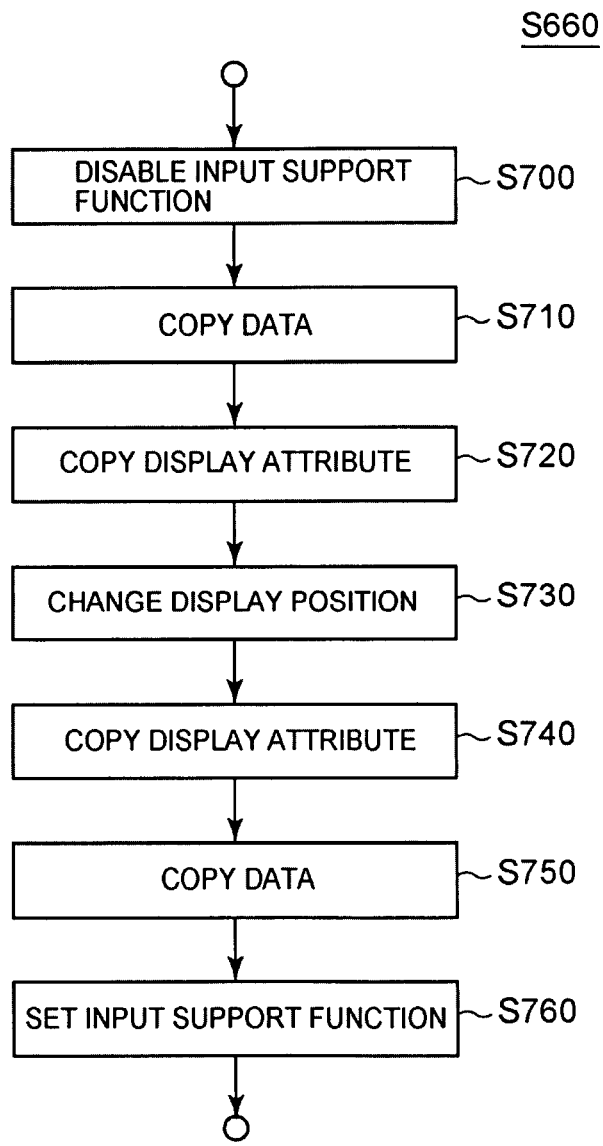
FIG. 7 is a diagram illustrating a detailed flow of processing in step S660 of FIG. 6.

In response to the detection of the second input field (S650: YES), field control unit 450 and function setting unit 440 perform the process of displaying the alternative field on the second input field in a superimposed manner (S660). FIG. 7 will be referenced briefly for the description.

FIG. 7 shows a detailed flow of the process in step S660 of FIG. 6. First, function setting unit 440 disables the first input support function corresponding to the first input field in the alternative field (S700). This process is performed, for example, by the following program:

dummy[(currently set event)]=null;

This disables an event set as one that should be detected to implement the first input support function such as, for example, a key input event. Subsequently, copy unit 430 copies data, which has been entered into the alternative field until selection detecting unit 425 detects the second input field, to the first input field (S710). This process is performed, for example, by the following program:

var inputField=document.getElementById(nowOrder);
    inputField.value=dummy.value;

The display attribute of the alternative field may be changed in the course of entering data into the alternative field. For example, as a result of some abnormal input, the background color of the alternative field may be changed to a color indicating abnormality. In such a case, it is preferable to carry over the display attribute of the alternative field to the first input field. Therefore, field control unit 450 copies the display attribute of the alternative field to the first input field (S720). This process is performed, for example, by the following program:

inputField.attribute=dummy.attribute;

In the above, "attribute" represents the display attribute. If a different name is used to indicate the display attribute, the above "attribute" may be changed to the name indicating the display attribute.

Subsequently, field control unit 450 moves and displays the alternative field to the position where the alternative field is superimposed on the second input field (S730). The display process is performed, for example, by the following program:

var nextField=document.getElementById(nextIf),
    dummy.coordinate x=nextField.coordinate x,
    dummy.coordinate y=nextField.coordinate y;

In the above, "coordinate x" and "coordinate y" represent the position where the input field is displayed. If a different name is used to indicate the position, the above "coordinate x" and "coordinate y" may be changed to the name indicating the position.

Subsequently, field control unit 450 copies the display attribute of the second input field to the alternative field (S740). This process is performed, for example, by the following program:

dummy.attribute=nextField.attribute;

The display attribute indicates, as described above, for example, the length of a field in the height direction, the length of the field in the width direction, the background color to be set to the field, the foreground color to be set to the field, a font of characters entered into the field, or the like. The carrying over of the display attribute allows the user to continue the input operation without awareness of the existence of the alternative field.

Subsequently, field control unit 450 copies data, which has already been entered in the second input field until selection detecting unit 425 detects the second input field, to the alternative field (S750). This process is performed, for example, by the following program:

dummy.value=nextField.value;

Then, function setting unit 440 reads the input support function associated with the second input field from storage device 204 and sets the read input support function to the alternative field (S760). This process is performed, for example, by the following program:

var eventStr=eventRegistryArray[nextId];
    eval(eventStr);

If, however, the input support functions to be set to the first input field and the second input field are identical to each other, function setting unit 440 may omit the disabling of the input support function described as step S700 and the setting of the input support function described as step S760. In other words, function setting unit 440 compares the first input support function corresponding to the first input field with the second input support function corresponding to the second input field, in response to the detection of the second input field subsequent to the first input field by selection detecting unit 425. If the first input support function and the second input support function are identical with each other, then function setting unit 440 causes the alternative field to accept the data input into the second input field with the first input support function set to the alternative field. In this regard, the determination of whether the input support functions are identical with each other may be simply done, for example, by determining whether the character strings of the input support functions associated with the input fields stored in storage device 204 are identical with each other. The simple determination results in a short processing time of the determination of whether the input support functions are identical, thereby improving the operationality by reducing the processing time by the omission of the processes.

The above processes cause the alternative field to be displayed on the second input field in a superimposed manner. Moreover, the display attribute of the second input field is carried over to the alternative field. Further, the data that has already been entered into the second input field is copied to the alternative field. This allows the user to continue the data input without awareness of the existence of the alternative field.

Returning to the description of FIG. 6, subsequently web browser 206 determines whether a predetermined termination condition is satisfied (S670). The termination condition is satisfied, for example, when the user requests another page by clicking a hyperlink, when the user requests another page by entering an address into the URL entry field, or in the case of the detection of an event of terminating the execution of the web browser 206. If so, the web browser 206 terminates the processing in FIG. 6.

On the other hand, unless the termination condition is satisfied (S670), web browser 206 returns the processing to step S650 to determine whether the user selected another input field (S650).

As described hereinabove with reference to FIG. 6 and FIG. 7, according to the client device 200 of this embodiment, the input support function is set to the alternative field according to a user's selection without setting the respective input support functions to the input fields every time a page is received, which thereby allows reduction in the waiting time for the processing at the time of receiving the page.

Moreover, the order of focusing on the input fields and the input field IDs are managed with a tab OrderArray variable, which enables the field selection with a tab key. Specifically, a data input is not accepted by an original input field, but by the alternative field in this embodiment. Therefore, a function of the tab key supported by the browser does not select an input field for data input. On the other hand, the control program 405 according to this embodiment manages the order of focusing on the input fields and the input field IDs and moves the alternative field every time the tab key is pressed, thereby providing the user with the same operability as an ordinary browser.

According to the web browser standard functions, it is possible to select an input field using an arrow key, in addition to or instead of the tab key, in a spreadsheet page in some cases. The client device 200 may perform control in response to a press of the arrow key in order to secure the same operability as the ordinary web browser also in the above case. An example of the control will be described as a variation with reference to FIG. 8.

Figure 8:
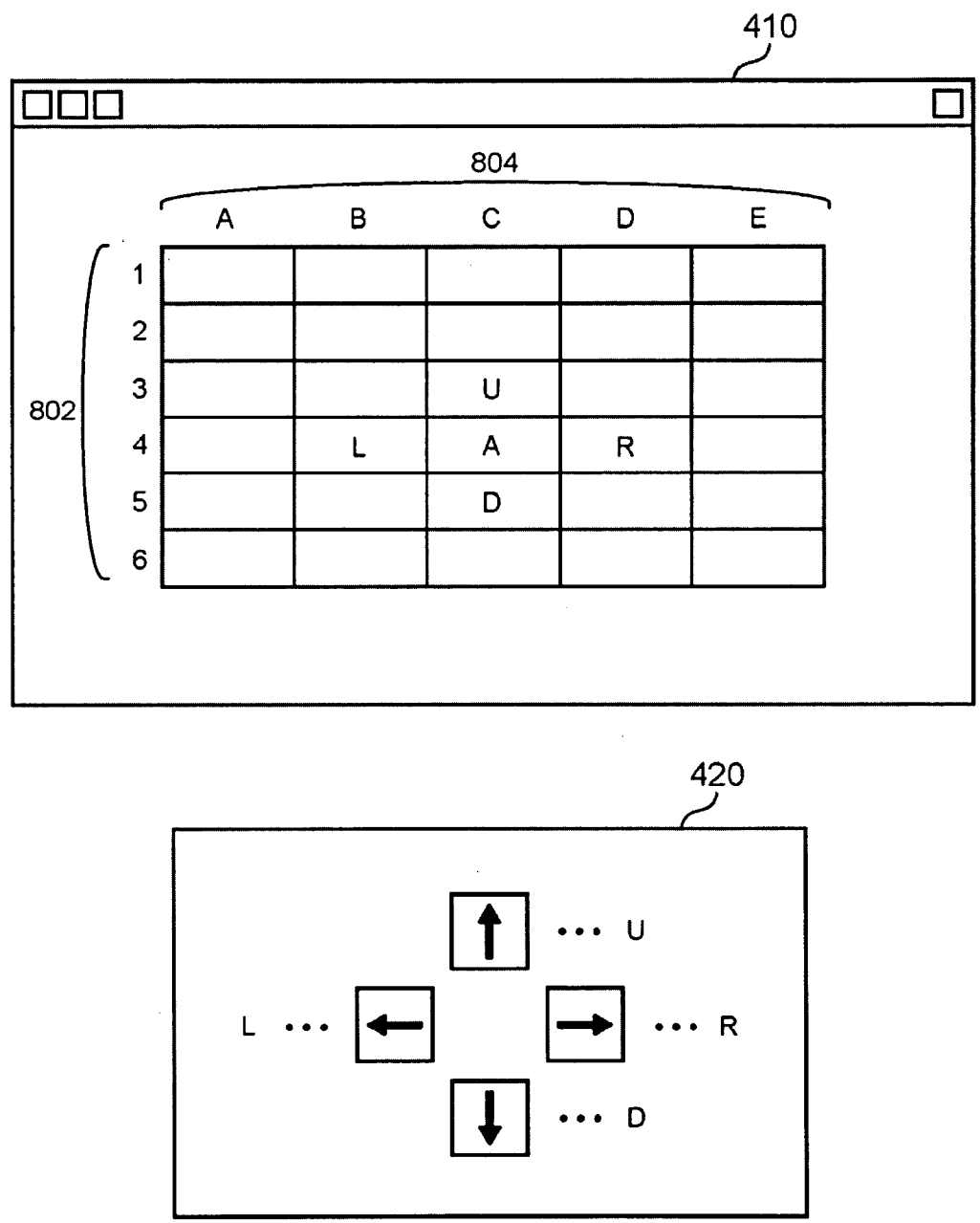
FIG. 8 is a diagram illustrating an example of a screen displayed on a display unit in a variation of the embodiment, along with an example of an input unit.

FIG. 8 shows an example of a screen displayed on display unit 410 (FIG. 4) in the variation of this embodiment along with an example of input unit 420 (FIG. 4). In this variation, display unit 410 displays the input fields arranged in a matrix having rows 1 to 6 (802) and columns A to E (804). Depending on the type of the web browser 206, such input fields in a matrix are selected using the arrow key.

For example, if the input unit 420 accepts an up (U) key input in a state where an input field (row 4 column C: hereinafter denoted as C4) is selected, the web browser 206 selects an input field C3 adjacent to the input field C4 at the upper side. If the input unit 420 accepts a down (D) key input similarly, the web browser 206 selects an input field C5 adjacent to the input field C4 at the lower side.

If the input unit 420 accepts an input of a left (L) key input, the web browser 206 selects an input field B4 adjacent to the input field C4 at the left side. If the input unit 420 accepts a right(R) key input similarly, the web browser 206 selects an input field D4 adjacent to the input field C4 at the right side.

In order to enable these operations to be performed without a sense of incongruity after introducing the alternative field, the processing is performed as described below in this variation. First, when receiving control program 405, storage device 204 stores a coordinate position in the arrangement in the matrix with respect to each of the plurality of input fields by a function of control program 405. This process is performed instead of the generation of the tab index in step S630 in the above FIG. 6. This process is expressed by the following embodiment:

var inputField=document.getElementById("input1");
    inputField.IndexX=<numeric indicating X coordinate of input field input 1>;
    inputField.IndexY=<numeric indicating Y coordinate of input field input1>;
    tabOrderArray[<numeric indicating X coordinate of input field input>][<numeric indicating Y coordinate of input field input1>]="input1";

With a repetition of the above processing with respect to each of the input fields in the displayed page, the coordinate positions are managed in association with the respective input fields. An array variable tabOrderArray generated as a result is, for example, as shown below. Note here that the origin of the coordinate system is located in the leftmost and uppermost input field in the matrix. In addition, the right direction on the screen display is taken as the positive direction of the X axis and the downward direction on the screen display is taken as the positive direction of the Y axis.

tabOrderArray[0][0]="input1"
    tabOrderArray[1][0]="input2"
    tabOrderArray[0][1]="input6"

In addition, selection detecting unit 425 detects an input field in response to a press of the arrow key, instead of detecting an input field in response to a press of the tab key in step S650 of FIG. 6. Specifically, when detecting an operation of the arrow key in a state where a certain first input field has already been detected, selection detecting unit 425 identifies a second input field adjacent in the arrow key direction to the first input field on the basis of the above coordinate position. Then, selection detecting unit 425 detects the identified second input field as an input field selected by the user. This process represented by a program as follows in this embodiment:

(Right key)
    nowLocationX++;
    var nextId=tabOrderArray[nowLocationX][nowLocationY];
    (Left key)
    nowLocationX--;
    var nextId=tabOrderArray[nowLocationX][nowLocationY];
    (Up key)
    nowLocationY--;
    var nextId=tabOrderArray[nowLocationX][nowLocationY];
    (Down key)
    nowLocationY++;
    var nextId=tabOrderArray[nowLocationX][nowLocationY], In the above, nowLocationX indicates the X coordinate of the first input field and nowLocationY indicates the Y coordinate of the first input field. In order to perform the selection of the input field with a press of the arrow key, the X coordinate and Y coordinate of the input field currently focused on are stored in the nowLocation X and nowLocation Y variables.

If an input field is clicked on by the pointing device, the X coordinate and Y coordinate clicked on are obtained, for example, by the following program:

var inputField=event.srcElement;
    nowLocationX=inputField.IndexX;
    nowLocationY=inputField.IndexY;

Other operations are substantially the same as the embodiment described with reference to FIG. 1 to FIG. 7 and therefore the description of the operations will be omitted here.

As described hereinabove, according to the variation of this embodiment, in the case where display unit 410 displays a large number of input fields arranged in a spreadsheet format, it is possible to move the alternative field appropriately by the operation of the arrow key. This enables the user to continue to use a favorite interface such as an arrow key after the introduction of the alternative field, thereby improving the working efficiency.

Figure 9:
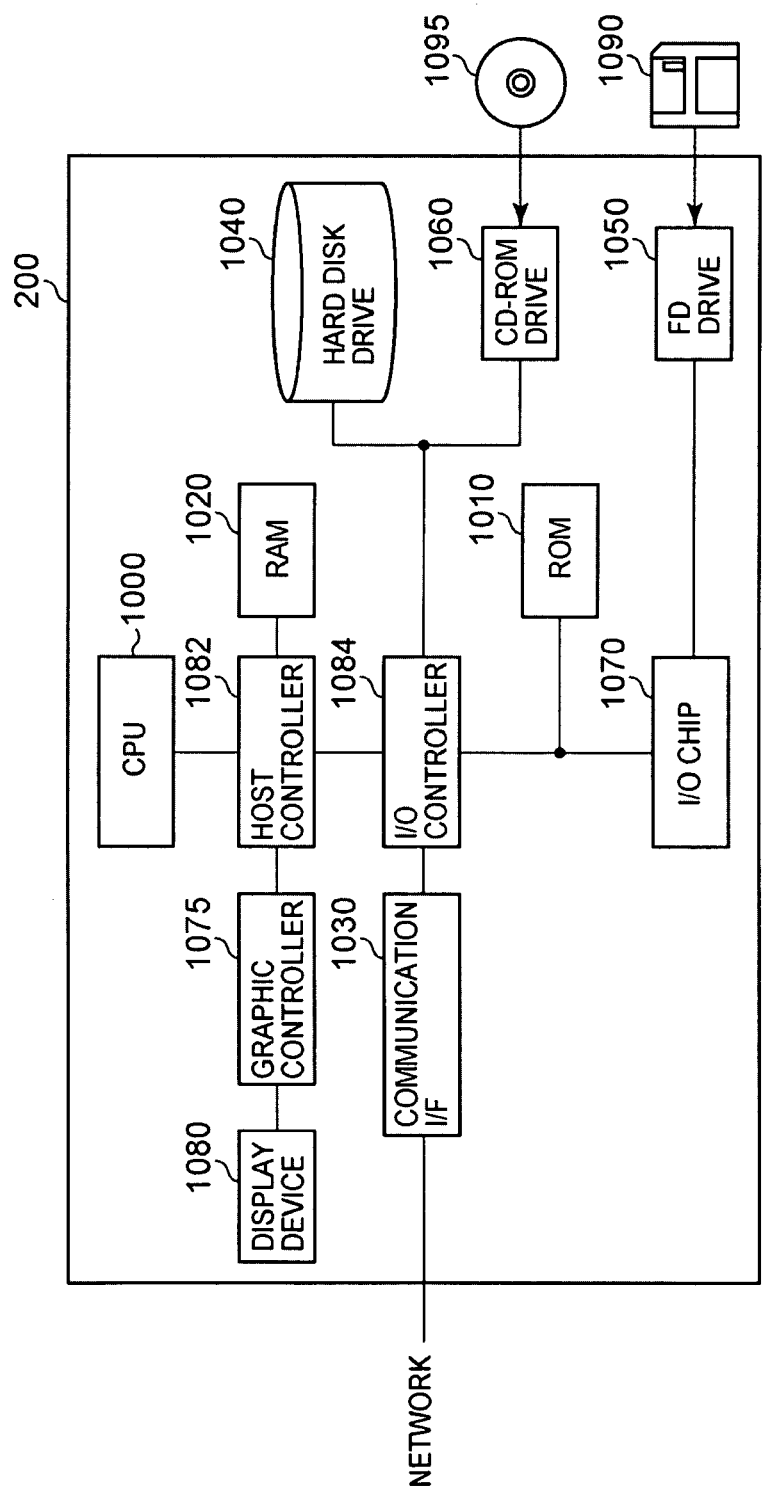
FIG. 9 is a diagram illustrating an example of a hardware configuration of a computer that functions as a client device in accordance with an embodiment of the present invention or the variation thereof.

FIG. 9 shows an example of a hardware configuration of a computer which functions as the client device 200 in accordance with an embodiment of the present invention or the variation thereof. The computer includes a CPU peripheral section having a CPU 1000, a RAM 1020, and a graphic controller 1075, which are connected to each other by a host controller 1082, an I/O section having a communication interface 1030, a hard disk drive 1040, and a CD-ROM drive 1060, which are connected to the host controller 1082 via an I/O controller 1084, and a legacy I/O section having a ROM 1010, a flexible disk drive 1050, and an I/O chip 1070, which are connected to the I/O controller 1084.

The host controller 1082 connects the RAM 1020 to the CPU 1000 and the graphic controller 1075 which access the RAM 1020 at high transfer rate. The CPU 1000 operates based on programs stored in the ROM 1010 and the RAM 1020 to control respective sections. The graphic controller 1075 acquires image data generated on a frame butter provided in the RAM 1020 by the CPU 1000 or the like and controls the display device 1080 (for example, an apparatus which implements the above display unit 410) to display the image data. Alternatively, the graphic controller 1075 may include inside the frame buffer for storing the image data generated by the CPU 1000.

The I/O controller 1084 connects the host controller 1082 to the communication interface 1030, the hard disk drive 1040, and the CD-ROM drive 1060, which are relatively high-speed I/O devices. The communication interface 1030, which implements, for example, the above communication interface 202, communicates with external devices via a network. The hard disk drive 1040, which is an example of the above storage device 104, stores programs and data used by the computer. The CD-ROM drive 1060 reads a program or data from a CD-ROM 1095 and provides the RAM 1020 or the hard disk drive 1040 with the program or data.

The I/O controller 1084 is connected to, for example, the input unit 420, the ROM 1010, the flexible disk drive 1050, the I/O chip 1070, and the like, which are relatively low-speed I/O devices. The ROM 1010 stores a boot program executed by the CPU 1000 on startup of the computer and programs that depend on the hardware of the computer. The flexible disk drive 1050 reads a program or data from a flexible disk 1090 and provides the RAM 1020 or the hard disk drive 1040 with the program or data via the I/O chip 1070. The I/O chip 1070 connects to the flexible disk 1090 or to various I/O devices via, for example, a parallel port, a serial port, a keyboard port, or a mouse port.

The program provided to the computer is stored in a recording medium such as the flexible disk 1090, the CD-ROM 1095, or an IC card and is provided by a user. The program is read from the recording medium via the I/O chip 1070 and/or the I/O controller 1084 and installed in the computer before it is executed. The operations that the program causes the computer or the like to perform are the same as the operations of the client device 200 described with reference to FIG. 1 to FIG. 8, and therefore the description is omitted here.

The above program may also be stored in an external storage medium. The storage medium that is usable is an optical recording medium such as a DVD or a PD, a magnet-optical recording medium such as an MD, a tape medium, or a semiconductor memory such as an IC card as well as the flexible disk 1090 and the CD-ROM 1095. In addition, it is possible to use a storage device, as a recording medium, such as a hard disk or a RAM provided in a server system connected to a private communication network or the Internet in order to provide the computer with the programs via the network.

As described hereinabove, in accordance with an embodiment of the present invention and the variation thereof, the input support functions are not set to the respective input fields at the time of displaying a page containing many input fields, but an input support function corresponding to a selected input field is set to an alternative field every time the input field is selected, thereby reducing the waiting time for the processing when the page is displayed without reducing the user friendliness caused by the input support. Specifically, for example, it is possible to cause almost no waiting time when the page is displayed even if various input support functions are set to a large number of input fields.

Moreover, the alternative field is displayed in a superimposed manner on the input field with the display attribute and input data carried over, which allows the user to continue the operation in a favorite method of operation without awareness of the existence of the alternative field. Moreover, the alternative field is moved in response to an operation of a tab key or arrow key, thereby achieving operability with less sense of incongruity in comparison with an existing web browser.

While the present invention has been described hereinabove in conjunction with the preferred embodiments, it is to be understood that the technical scope of the present invention is not limited to the above described embodiments. It is apparent to those skilled in the art that various modifications or improvements may be made to the above embodiments. It is apparent from the appended claims that the technical scope of the present invention may include the embodiments in which such modifications or improvements have been made.

What is claimed is:

1. A method for supporting user data input comprising:
    receiving a page for display on a display unit, wherein the page includes a plurality of input fields;
    receiving a plurality of input support functions, wherein each of the plurality of input support functions is associated with each of the plurality of input fields;
    detecting a first of the plurality of input fields in accordance with a user selection;
    generating a single alternative user input field for receiving all the user data input, the single alternative user input field superposed on the first of the plurality of input fields allowing a user to input data without awareness of the existence of the single alternative user input field;
    setting a first of the plurality of input support functions associated with the first of the plurality of input fields to the single alternative user input field wherein each of the plurality of input support functions is alternately set to the single alternative user input field, such that only input support functions corresponding with the user selection are enabled at a time;
    entering a first user data input by the user into the single alternative user input field; and
    copying the first user data input entered into the single alternative user input field to the first of the plurality of input fields.

2. The method of claim 1, further comprising:
    generating a tab index, wherein the tab index is configured to move the single alternative user input field to a next input field in response to a tab key stroke.

3. The method of claim 1, further comprising:
    detecting a second of the plurality of input fields in accordance with a user selection;
    disabling the first of the plurality of input support functions;
    setting a second of the plurality of input support functions associated with the second of the plurality of input fields to the single alternative user input field;
    entering a second user data input by the user into the single alternative user input field; and
    copying the second user data input entered into the single alternative user input field to the second of the plurality of input fields.

4. The method of claim 3, further comprising:
    before entering the first user data input, moving the single alternative user input field to substantially superimpose the first of the plurality of input fields; and
    before entering the second user data input, moving the single alternative user input field to substantially superimpose the second of the plurality of input fields.

5. The method of claim 4, further comprising:
    modifying a first display attribute of the single alternative user input field to match a second display attribute of the plurality of input fields.

6. The method of claim 4, further comprising:
    if the first of the plurality of input fields contains a first previous data before the entering, copying the first previous data into the single alternative user input field; and
    if the second of the plurality of input fields contains a second previous data before the entering, copying the second previous data into the single alternative user input field.

7. The method of claim 1, wherein the user selection is an operation selected from the group consisting of: a tab key press, a tab key release, a key press, a key release, a mouse, and a key click.

8. The method of claim 1, wherein the page is a web page displayed on a web browser.

9. The method of claim 1, wherein the method is enabled in JAVASCRIPT™.

10. A computer program product for supporting user data input using a computing device, the computer program product comprising:
- a non-transitory computer readable medium;
- first program instructions for receiving a page for display on a display unit, wherein the page includes a plurality of input fields;
- second program instructions for receiving a plurality of input support functions, wherein each of the plurality of input support functions is associated with each of the plurality of input fields;
- third program instructions for detecting first of the plurality of input fields in accordance with a user selection
- fourth program instructions for generating a single alternative user input field for receiving all the user data input, the single alternative user input field superposed on the first of the plurality of input fields allowing a user to input data without awareness of the existence of the single alternative user input field;
- fifth program instructions for setting a first of the plurality of input support functions associated with the first of the plurality of input fields to the single alternative user input field wherein each of the plurality of input support functions is alternately set to the single alternative user input field, such that only input support functions corresponding with the user selection are enabled at a time;
- sixth program instructions for entering a first user data input by the user into the single alternative user input field; and
- seventh program instructions for copying the first user data input entered into the single alternative user input field to the first of the plurality of input fields.

11. The computer program product of claim 10, further comprising:
- eighth program instructions for generating a tab index, wherein the tab index is configured to move the single alternative user input field to a next input field in response to a tab key stroke.

12. The computer program product of claim 10, further comprising:
- ninth program instructions for detecting a second of the plurality of input fields in accordance with a user selection;
- tenth program instructions for disabling the first of the plurality of input support functions;
- eleventh program instructions for setting a second of the plurality of input support functions associated with the second of the plurality of input fields to the single alternative user input field;
- twelfth program instructions for by the user a second user data input into the single alternative user input field; and
- thirteenth program instructions for copying the second user data input entered into the single alternative user input field, to the second of the plurality of input fields.

13. The computer program product of claim 12, further comprising:
- before entering the first user data input, fourteenth program instructions for moving the single alternative user input field to substantially superimpose the first of the plurality of input fields; and
- before entering the second user data input, fifteenth program instructions for moving the single alternative user input field to substantially superimpose the second of the plurality of input fields.

14. The computer program product of claim 13, further comprising:
- sixteenth program instructions for modifying a first display attribute of the single alternative user input field to match a second display attribute of the plurality of input fields.

15. The computer program product of claim 13, further comprising:
- if the first of the plurality of input fields contains a first previous data before the entering, seventeenth program instructions for copying the first previous data into the single alternative user input field; and
- if the second of the plurality of input fields contains a second previous data before the entering, eighteenth program instructions for copying the second previous data into the single alternative user input field.

16. A system for supporting user data input, comprising:
- a display unit for displaying a page containing a plurality of input fields;
- a storage device for storing a plurality of input support functions associated with the plurality of input fields;
- a field generation unit for generating a single alternative user input field, wherein the single alternative user input field is configured for accepting all data input on behalf of the plurality of input fields, and wherein the single alternative user input field is displayed on the page, the single alternative user input field superposed on the of the plurality of input fields allowing a user to input data without awareness of the existence of the single alternative user input field;
- a selection detecting unit for detecting one of the plurality of input fields selected by a user in order to enter data;
- a function setting unit for setting one of the plurality of input support functions associated with the one of the plurality of input fields detected to the single alternative user input field wherein each of the plurality of input support functions is alternately set to the single alternative user input field, such that only input support functions corresponding with the user selection are enabled at a time; and
- a copy unit for copying any data in the one of the plurality of input fields into the single alternative user input field.

17. The system according to claim 16, further comprising a field control unit for moving and displaying the single alternative user input field to a position corresponding with the one of the plurality of input fields, in response to the detecting by the selection detecting unit.

18. The system according to claim 17, wherein the single alternative user input field is substantially superimposed on the one of the plurality of input fields.

19. The system according to claim 17, wherein the field control unit is further configured to set a display attribute of the one of the plurality of input fields to the single alternative user input field.

20. The system according to claim 16, wherein the selection detecting unit detects an operation selected from the group consisting of a tab key press, a tab key release, a key press, a key release, a mouse, and a key click.

21. The system according to claim 16, wherein the storage device is further configured to store an order of focusing of the plurality of input fields, with a page order associated with each of the plurality of input fields on the page.

22. The system according to claim 21, wherein the order of focusing is associated with a tab index.

23. A method for supporting user data input comprising:
- receiving a page for display on a display unit, wherein the page includes a plurality of input fields;

receiving a plurality of input support functions, wherein each of the plurality of input support functions is associated with each of the plurality of input fields;

detecting a first of the plurality of input fields in accordance with a user selection;

generating a single alternative user input field for receiving all the user data input, the single alternative user input field superposed on the first of the plurality of input fields allowing a user to input data without awareness of the existence of the single alternative user input field;

generating a tab index, wherein the tab index is configured to move the single alternative user input field to a next input field in response to a tab key stroke;

setting a first of the plurality of input support functions associated with the first of the plurality of input fields to the single alternative user input field wherein each of the plurality of input support functions is alternately set to the single alternative user input field, such that only input support functions corresponding with the user selection are enabled at a time;

moving the single alternative user input field to substantially superimpose the first of the plurality of input fields;

entering a first user data input by the user into the single alternative user input field; and copying the first user data input entered into the single alternative user input field to the first of the plurality of input fields.

24. The method of claim 23, further comprising:

detecting a second of the plurality of input fields in accordance with a user selection;

disabling the first of the plurality of input support functions;

setting a second of the plurality of input support functions associated with the second of the plurality of input fields to the single alternative user input field;

moving the single alternative user input field to substantially superimpose the second of the plurality of input fields;

entering a second user data input by the use into the single alternative user input field; and copying the second user data input entered into the single alternative user input field to the second of the plurality of input fields.

* * * * *

UNITED STATES PATENT AND TRADEMARK OFFICE
CERTIFICATE OF CORRECTION

PATENT NO. : 8,589,817 B2
APPLICATION NO. : 12/350882
DATED : November 19, 2013
INVENTOR(S) : Shunsuke Fujimoto, Kiyonori Komiya and Ken Kumagai Page 1 of 1

It is certified that error appears in the above-identified patent and that said Letters Patent is hereby corrected as shown below:

On the Title Page

Item (75) Inventors should read: Shunsuke Fujimoto, Kanagawa-ken (JP); Kiyonori Komiya, Kawasaki (JP); Ken Kumagai, Kangawa (JP)

Item (73) Assignee should read: International Business Machines Corporation, Armonk, NY (US)

Signed and Sealed this
Eleventh Day of February, 2014

Michelle K. Lee
*Deputy Director of the United States Patent and Trademark Office*